US006881280B2

(12) United States Patent
Qiao

(10) Patent No.: US 6,881,280 B2
(45) Date of Patent: Apr. 19, 2005

(54) IRON-BASED ALLOY FOR INTERNAL COMBUSTION ENGINE VALVE SEAT INSERTS AND THE LIKE

(75) Inventor: Cong Yue Qiao, Menominee, MI (US)

(73) Assignee: L.E. Jones Company, Menominee, MI (US)

( * ) Notice: Subject to any disclaimer, the term of this patent is extended or adjusted under 35 U.S.C. 154(b) by 93 days.

(21) Appl. No.: 10/218,912

(22) Filed: Aug. 15, 2002

(65) Prior Publication Data

US 2003/0103860 A1 Jun. 5, 2003

Related U.S. Application Data

(63) Continuation of application No. 09/583,811, filed on May 30, 2000, now Pat. No. 6,436,338.
(60) Provisional application No. 60/137,651, filed on Jun. 4, 1999.

(51) Int. Cl.$^7$ .......................... C22C 38/30; C22C 38/22; C22C 38/24; C22C 38/26
(52) U.S. Cl. ............................ 148/325; 420/37; 420/38; 420/39; 420/69; 420/67; 420/101; 420/102
(58) Field of Search ........................... 148/325; 420/69, 420/67, 101, 102, 37, 38, 39

(56) References Cited

U.S. PATENT DOCUMENTS 6,436,338 B1 * 8/2002 Qiao .......................... 420/69

* cited by examiner

*Primary Examiner*—Deborah Yee
(74) *Attorney, Agent, or Firm*—Burns, Doane, Swecker & Mathis, L.L.P.

(57) ABSTRACT

An iron-based corrosion resistant and wear resistant alloy is addressed. The alloy contains (in weight percent) 1.1–1.4% carbon, 11–14.25% chromium, 4.75–6.25% molybdenum, 3.5–4.5% tungsten, 0–3% cobalt, 1.5–2.5% niobium, 1–1.75% vanadium, 0–2.5% copper, up to 1.0% silicon, up to 0.8% nickel, up to 0.6% manganese, and the balance iron. The alloy is suitable for use in valve seat insert applications.

26 Claims, No Drawings

IRON-BASED ALLOY FOR INTERNAL COMBUSTION ENGINE VALVE SEAT INSERTS AND THE LIKE

RELATED APPLICATION

This application is a continuation of application Ser. No. 09/583,811, filed on May 30, 2000, now U.S. Pat. No. 6,436,338 which claims the benefit of Provisional Application No. 60/137,651, filed Jun. 4, 1999.

FIELD OF THE INVENTION

The present invention relates to corrosion and wear resistant iron-based alloys, and particularly to alloys for use in valve seat inserts.

BACKGROUND OF THE INVENTION

In diesel engines containing valve seat inserts, more restrictive exhaust emissions laws for diesel engines have driven changes in engine design including the need for high-pressure electronic fuel injection systems. Engines built with these systems have experienced significantly higher wear rates in their intake inserts and valves. This has driven a shift in material selection toward materials which offer improved wear resistance relative to the martensitic stainless steels which have traditionally been employed by the diesel industry.

Another emerging trend in diesel engine development is the use of EGR (exhaust gas recirculation) to further reduce exhaust emissions. With EGR, exhaust gas is routed back into the intake air stream. Since exhaust gas contains compounds of nitrogen, sulfur, chlorine, and other elements which potentially can form acids, the need for improved corrosion resistance for alloys used in intake insert applications is greatly increased for diesel engines using EGR. Acid can attack both insert and valves leading to premature engine failure. Earlier attempts to achieve improved corrosion resistance were typically accomplished through the use of martensitic stainless steels. Though these steels provide good corrosion resistance, martensitic stainless steels do not have adequate wear resistance to meet the requirements for valve seat inserts in modem diesel truck engines.

A desirable alloy would exhibit good corrosion and wear resistance suitable for use in intake insert applications in diesel engines using EGR.

SUMMARY OF THE INVENTION

The present invention provides an iron-based alloy with both good corrosion resistance and good wear resistance. The alloy is suitable for use in intake valve seat insert applications, even in diesel engines using EGR.

One aspect of the invention is an iron-based alloy comprising, in weight percentage: carbon from about 1.1 to about 1.4; chromium from about 11 to about 14.25; molybdenum from about 4.75 to about 6.25; tungsten from about 3.5 to about 4.5; cobalt from 0 to about 3; niobium from about 1.5 to about 2.5; vanadium from about 1 to about 1.75; copper from 0 to about 2.5; silicon up to about 1; nickel up to about 0.8; manganese up to about 0.6; and iron from about 61 to about 77.15.

Another aspect of the invention is a cast, iron-based alloy comprising, in weight percentage: carbon from about 1.1 to about 1.4; chromium from about 11 to about 14.25; molybdenum from about 4.75 to about 6.25; tungsten from about 3.5 to about 4.5; and the balance iron, other alloying elements, and incidental impurities.

In another aspect of the invention, parts such as valve seat inserts are made from the alloy, such as by casting or forming from a powder and sintering, or the alloy may be used to hard-face the parts.

DETAILED DESCRIPTION OF THE INVENTION

The present invention is directed to an iron-based alloy with good corrosion resistance and wear resistance. The alloy is designed particularly for use in internal combustion engine valve seat inserts, but many other applications are feasible.

In order to accomplish both corrosion resistance and wear resistance, the alloy has a microstructure similar to martensitic tool steels. Martensitic tool steels for valve seat inserts exhibit a microstructure comprised of small secondary carbides in a fine equiaxed grain structure. In contrast, martensitic stainless steels used for valve seat inserts typically comprise large primary carbides in a coarser columnar casting structure. The finer equiaxed casting structures have greater wear resistant properties than coarser columnar structures. Although tool steels tend to exhibit good wear resistance, stainless steels typically exhibit greater corrosion resistance. The alloy of the present invention is particularly beneficial in that it exhibits both good wear resistance and good corrosion resistance.

The alloy exhibits a microstructure and hardness similar to cast tool steel with greatly improved corrosion resistance. The alloy of the invention may be made in cast, powdered metal, or hardfacing forms by conventional methods. The alloy is preferably manufactured by casting, which is a well-known process involving melting the alloy components and pouring the molten mixture into a mold. In a preferred embodiment, the alloy is used in the manufacture of valve seat inserts for use in heavy-duty diesel engines. The alloy may find advantageous utility in other applications including, but not limited to, valve seat inserts made for gasoline, natural gas, or alternatively fueled internal combustion engines. Valve seat inserts may be manufactured by conventional methods known in the art.

The alloy of the invention exhibits good corrosion resistance while maintaining the fine-grained martensitic tool steel microstructure which provides excellent wear resistance. In addition to good corrosion and wear resistance, the alloy also possesses good high-temperature properties.

The chromium level and carbon content are believed to contribute to the beneficial properties of the alloy. Chromium (Cr) is present in the alloy in an amount of at least about 11 weight percent of the total alloy; preferably, at least about 11.5 weight percent; more preferably, at least about 12 weight percent; even more preferably, at least about 12.75 weight percent. The chromium content is less than about 14.25 weight percent; preferably, less than about 14.15 weight percent; more preferably less than about 14 weight percent; even more preferably less than about 13.50 weight percent; most preferably about 13 weight percent. This relatively high chromium level provides the beneficial corrosion resistance properties of stainless steel.

The good wear resistance properties are believed to be attributed to the microstructure and hardness of the alloy. The relatively low carbon concentration inhibits the formation of primary carbides and instead results in the formation of secondary carbides which, as discussed above, are finer. A primary carbide typically forms before the bulk material freezes. In contrast, secondary carbides freeze after the bulk material freezes.

Carbon (C) is present in the alloy in an amount ranging from about 1.1 to about 1.4 weight percent of the total alloy; preferably, at least about 1.15 weight percent; preferably, at most about 1.35 weight percent; most preferably, about 1.25 weight percent.

Molybdenum (Mo) is present in the alloy in an amount ranging from about 4.75 to about 6.25 weight percent of the total alloy; preferably, at least about 5 weight percent; more preferably, at least about 5.25 weight percent; preferably, at most about 6.15 weight percent; more preferably at most about 6 weight percent.

Tungsten (W) is present in the alloy in an amount ranging from about 3.5 to about 4.55 weight percent of the total alloy; preferably, at least about 3.75 weight percent; preferably, at most about 4.5 weight percent.

Cobalt (Co) may be present in the alloy in an amount less than about 3 weight percent of the total alloy; preferably, at most about 2.5 weight percent; more preferably, at most about 2.45 weight percent; even more preferably, at most about 2.25 weight percent; preferably, at least about 1.5 weight percent; more preferably, at least about 1.75 weight percent; even more preferably, at least about 1.95 weight percent; most preferably, about 2 weight percent cobalt is employed. Cobalt is believed to improve hot hardness. Alternatively, copper may be substituted for cobalt.

Copper (Cu) may be present in the alloy in an amount less than about 2.5 weight percent of the total alloy; preferably, about 2 weight percent if no cobalt is employed.

Niobium (Nb) is present in the alloy in an amount ranging from about 1.5 to about 2.55 weight percent of the total alloy; preferably, at least about 1.75 weight percent; preferably, at most about 2.5 weight percent. Niobium is added to provide microstructure grain refinement. Preferably, the Niobium content is about 2 weight percent.

Vanadium (V) may be present in the alloy in an amount ranging from about 1 to about 1.75 weight percent of the total alloy; preferably, at least about 1.15 weight percent.

Silicon (Si) may be present in the alloy in an amount up to about 1 weight percent of the total alloy.

Nickel (Ni) may be present in the alloy in an amount up to about 0.8 weight percent of the total alloy.

Manganese (Mn) may be present in the alloy in an amount up to about 0.6 weight percent of the total alloy.

Boron (B) may be present in the alloy in less than about 1.0 weight percent of the total alloy. Preferably, no boron is included.

The balance of the alloy is iron (Fe), and incidental impurities. Generally, the alloy contains an amount ranging from about 61 to about 77 weight percent iron.

EXAMPLES

A cast alloy is prepared having the following composition.

TABLE 1

| Element | Weight Percent |
| --- | --- |
| Carbon | 1.25 |
| Silicon | 0.6 |
| Chromium | 13.15 |
| Molybdenum | 5.75 |
| Tungsten | 4.0 |
| Cobalt | 2.05 |
| Vanadium | 1.25 |

TABLE 1-continued

| Element | Weight Percent |
| --- | --- |
| Niobium | 2.05 |
| Manganese | 0.3 |
| Nickel | 0.55 |
| Iron | 69.05 |

Example 1

Hardness

The hardness of an alloy having the composition shown in Table 1 was tested at room temperature and at various elevated temperatures.

The Rockwell C hardness of the resulting alloy at room temperature is 45. For comparison, the hardness of a martensitic stainless steel (J125) and a martensitic tool steel (J120V) is also measured. J125 and J120V are available from L. E. Jones Company. The Rockwell C hardness of J125 and J120V at room temperature is 40 and 44, respectively. The hot hardness results are shown below.

| | Hardness (HV10) | | |
| --- | --- | --- | --- |
| Temperature | Invention | J125 | J120V |
| 75° F. (24° C.) | 583 | 397 | 536 |
| 200° F. (93° C.) | 548 | 389 | 530 |
| 400° F. (204° C.) | 508 | 358 | 493 |
| 600° F. (315° C.) | 484 | 344 | 465 |
| 800° F. (427° C.) | 445 | 306 | 416 |
| 1000° F. (538° C.) | 348 | 215 | 344 |
| 1200° F. (649° C.) | 198 | 119 | 209 |
| 1400° F. (760° C.) | 100 | 47 | 104 |

The alloy of the invention possesses excellent hot hardness with results which are comparable to or exceed those of tool steel at all elevated temperature levels tested.

Example 2

Compressive Yield Strength (CYS)

| Temperature | Invention | J125 | J120V |
| --- | --- | --- | --- |
| 75° F. (24° C.) | 169 ksi (1165 MPa) | 139 ksi (958 MPa) | 198 ksi (1365 MPa) |
| 600° F. (315° C.) | 141 ksi (972 MPa) | 125 ksi (862 MPa) | 153 ksi (1055 MPa) |
| 800° F. (427° C.) | 136 ksi (938 MPa) | 120 ksi (827 MPa) | 139 ksi (958 MPa) |

Example 3

Coefficient of Thermal Expansion (CTE)

| Temperature | Invention | J125 | J120V |
|---|---|---|---|
| 25–200° F. (–4–93° C.) | 9.93 | 11.00 | 11.08 |
| 25–400° F. (–4–204° C.) | 10.89 | 12.25 | 12.24 |
| 25–600° F. (–4–315° C.) | 11.57 | 12.91 | 12.76 |

All CTE values are expressed in ($\times 10^{-6}$ mm/mm° C.).

Example 4

Thermal Conductivity

| Temperature | Invention | J125 | J120V |
|---|---|---|---|
| 25° F. (–4° C.) | 16.8 | 15.4 | 23.4 |
| 200° F. (93° C.) | 20.8 | 18.8 | 28.3 |
| 400° F. (204° C.) | 23.9 | 20.1 | 27.8 |
| 600° F. (315° C.) | 24.9 | 23.7 | 27.6 |

All thermal conductivity values are expressed in W/mK.

Example 5

Corrosion Resistance

Sulfidation Test: The sulfidation test involves heating a pre-weighed cylindrical test specimen (½" (12.7 mm) diameter×½" (12.7 mm) length) to a temperature of 1500° F. (816° C.) for 100 hours while submersing the specimen in a powder mixture as follows:

10 parts CaSO$_4$, 6 parts BaSO$_4$, 2 parts Na$_2$SO$_4$, 1 part Graphite

When the 100-hour bake is complete, the specimens are carefully cleaned and re-weighed. The difference in weight per unit surface area before and after test is then calculated. Sulfidation test results for the alloy of the invention, J125, and J120V were as follows:

| Weight Loss (g/cm$^2$): | Invention: | +0.05 g. |
|---|---|---|
| | J125: | –0.08 g. |
| | J120V: | –54.7 g. |

The sulfidation test results show that the alloy of the invention and J125 experienced little to no corrosion while J120V corroded very heavily. Thus, the alloy of the invention provides good sulfidation resistance compared to a tool steel.

Oxidation Test: The oxidation test involves heating pre-weighed test specimens exposed to air to an elevated temperature such as 900° F. (482° C.), and 1300° F. (704° C.), and 1500° F. (816° C.) for 50 minutes. After cooling in air, the part is re-weighed to determine weight gain due to oxidation. Results were as follows:

Weight gain is expressed in g/cm$^2$ and in parentheses in mg/(hr m$^2$).

| Temperature | Invention | J125 | J120V |
|---|---|---|---|
| 900° F. (482° C.) | <0.1 (1.2) | <0.1 (1.2) | 1.3 (15.6) |
| 1300° F. (704° C.) | 0.8 (9.6) | 0.4 (4.8) | 2.8 (33.6) |
| 1500° F. (816° C.) | 5.7 (68.4) | 0.6 (7.2) | 12.4 (148.8) |

The results of this test show that the alloy of the invention exhibits a substantial improvement over J120V, particularly at the 900° F. and 1300° F. temperatures. Improvement at these temperatures is most relevant since insert temperatures are typically 900° F. (482° C.) or below.

A second oxidation test involves heating preweighed specimens exposed to air to an elevated temperature of 800° F. (427° C.) for 100 hours. After cooling in a vacuum, the part is reweighed to determine weight gain due to oxidation. Results were as follows:

Weight gain is expressed in mg/(hr m$^2$).

| Temperature | Invention | J120V |
|---|---|---|
| 800° F. (427° C.) | 0.4 | 3.9 |

Example 6

Wear Testing

Wear tests were performed on a wear test fixture. The fixture simulates constant speed, sliding wear without lubrication. A stationary ⅜" (9.5 mm) wide test block is held against a ½" (12.7 mm) diameter cylinder rotating at 1725 RPM at loads of 4.5 pounds (2.05 kg), 9 pounds (4.10 kg), and 13.5 pounds (6.15 kg). Cylinder material is Eatonite 6, a commonly used valve facing material. Results in terms of weight loss on the test block are as follows:

| | | Test Block Weight Loss (milligrams) | | | |
|---|---|---|---|---|---|
| | | Invention | | J120V | |
| Load (kg) | J125 | Test 1 | Test 2 | Test 1 | Test 2 |
| 2.05 | 50 | 25 | 16 | 15 | 20 |
| 4.10 | 65 | 40 | 30 | 29 | 27 |
| 6.15 | 160 | 50 | 32 | 27 | 31 |

These results show the alloy of the invention has improved wear resistance relative to stainless steels like J125 which is traditionally employed in the diesel industry.

What is claimed is:

1. An iron-based alloy comprising, in weight percentage:
   carbon in an amount effective to inhibit formation of primary carbides;
   chromium from about 11 to about 14.25;
   molybdenum from about 4.75 to about 6.25;
   tungsten from about 3.5 to about 4.5;
   cobalt from 0 to about 3;
   niobium from about 1.5 to about 2.5;
   vanadium from about 1 to about 1.75;
   copper from 0 to about 2.5;

silicon up to about 1;
nickel up to about 0.8;
manganese up to about 0.6; and
iron from about 61 to about 77.15.

2. The alloy of claim 1, wherein the alloy comprises at least about 1.15 to about 1.35 weight percent carbon.

3. The alloy of claim 1, wherein the alloy comprises at least about 11.5 weight percent chromium.

4. The alloy of claim 1, wherein the alloy comprises at most about 14 weight percent chromium.

5. The alloy of claim 1 wherein the alloy comprises from about 1.5 to about 2.5 weight percent cobalt.

6. The alloy of claim 1 wherein the alloy comprises about 2 weight percent copper or about 2 weight percent cobalt.

7. The iron-based alloy of claim 1 wherein the alloy comprises:

| Element | Weight Percent |
|---|---|
| Chromium | 12.75–13.5 |
| Molybdenum | 5–6 |
| Tungsten | 3.75–4.5 |
| Cobalt | 1.5–2.5 |
| Niobium | 1.75–2.5 |
| Vanadium | 1.15–1.75 |
| Copper | 0–2.5 |
| Silicon | up to 1 |
| Nickel | up to 0.8 |
| Manganese | up to 0.6 |
| Iron | balance. |

8. The alloy of claim 1, wherein the alloy includes 0 weight percent boron.

9. The alloy of claim 1 comprising:
about 0.6 weight percent silicon;
about 13.15 weight percent chromium;
about 5.75 weight percent molybdenum;
about 4.0 weight percent tungsten;
about 2.05 weight percent cobalt;
about 1.25 weight percent vanadium;
about 2.05 weight percent niobium;
about 0.3 weight percent manganese;
about 0.55 weight percent nickel; and
about 69.05 weight percent iron.

10. The alloy of claim 1, wherein said alloy is manufactured by casting.

11. The alloy of claim 7, wherein said alloy is manufactured by casting.

12. A valve seat insert made of the alloy of claim 1.

13. A valve seat insert made of alloy of claim 7.

14. A valve seat insert of an internal combustion engine, said valve seat insert made of an alloy comprising, in weight percentage:
carbon in an amount effective to inhibit formation of primary carbides;
chromium from about 11 to about 14.25;
molybdenum from about 4.75 to about 6.25;
tungsten from about 3.5 to about 4.5;
cobalt from 0 to about 3;
niobium from about 1.5 to about 2.5;
vanadium from about 1 to about 1.75;
copper from 0 to about 2.5;
silicon up to about 1;
nickel up to about 0.8;
manganese up to about 0.6; and
iron from about 61 to about 77.15.

15. The valve seat insert of claim 14, wherein said alloy is manufactured by casting.

16. A cast, iron-based alloy comprising, in weight percentage:
carbon in an amount effective to inhibit formation of primary carbides;
chromium from about 11 to about 14.25;
molybdenum from about 4.75 to about 6.25;
nickel up to about 0.8;
tungsten from about 3.5 to about 4.5; and
the balance, iron, other alloying elements and incidental impurities.

17. A valve seat insert made of the alloy of claim 16.

18. The alloy of claim 16 further comprising from about 1.5 to about 2.5 weight percent niobium.

19. The alloy of claim 16 wherein the alloy further comprises about 2 weight percent copper or about 2 weight percent cobalt.

20. An iron-based alloy having carbon in an amount effective to inhibit formation of primary carbides, the alloy further comprising:

| Element | Weight Percent |
|---|---|
| Chromium | 12.75–14.15 |
| Molybdenum | 5.25–6.15 |
| Tungsten | 3.75–4.55 |
| Cobalt | 1.95–2.45 |
| Niobium | 1.75–2.55 |
| Vanadium | 1.15–1.75 |
| Copper | 0–2 |
| Silicon | up to 1 |
| Nickel | up to 0.8 |
| Manganese | up to 0.6 |
| Boron | 0–1 |
| Iron | balance. |

21. The alloy of claim 1, wherein the alloy comprises an equiaxed microstructure with secondary carbides.

22. The valve seat of claim 14, wherein the alloy comprises an equiaxed microstructure with secondary carbides.

23. The cast, iron-based alloy of claim 16, wherein the alloy comprises an equiaxed microstructure with secondary carbides.

24. The alloy of claim 1, wherein the alloy has a fine-grained martensitic tool steel microstructure.

25. The valve seat of claim 14, wherein the alloy has a fine-grained martensitic tool steel microstructure.

26. The cast, iron-based alloy of claim 16, wherein the alloy has a fine-grained martensitic tool steel microstructure.

* * * * *